(12) United States Patent
Li et al.

(10) Patent No.: US 10,787,865 B2
(45) Date of Patent: Sep. 29, 2020

(54) IN-SITU INJECTION OF SOIL AND GROUNDWATER—HIGH PRESSURE ROTARY JET GROUTING IN-SITU REMEDIATION SYSTEM AND METHOD

(71) Applicant: BCEG ENVIRONMENTAL REMEDIATION CO., LTD, Beijing (CN)

(72) Inventors: Shupeng Li, Beijing (CN); Yuewei Yang, Beijing (CN); Lili Guo, Beijing (CN); Peng Liu, Beijing (CN); Yue Zhang, Beijing (CN); Xiaowei Song, Beijing (CN); Fan Chen, Beijing (CN); Pengcheng Yin, Beijing (CN); Fuwang Wang, Beijing (CN); Yan Liu, Beijing (CN); Qiang Niu, Beijing (CN); Fanyang Bu, Beijing (CN)

(73) Assignee: BCEG Environmental Remediation Co., Ltd, Beijing (CN)

( * ) Notice: Subject to any disclaimer, the term of this patent is extended or adjusted under 35 U.S.C. 154(b) by 0 days.

(21) Appl. No.: 16/306,856

(22) PCT Filed: May 16, 2017

(86) PCT No.: PCT/CN2017/084472
§ 371 (c)(1),
(2) Date: Dec. 3, 2018

(87) PCT Pub. No.: WO2017/219792
PCT Pub. Date: Dec. 28, 2017

(65) Prior Publication Data
US 2019/0145190 A1 May 16, 2019

(30) Foreign Application Priority Data

Jun. 23, 2016 (CN) .......................... 2016 1 0464626

(51) Int. Cl.
*B09C 1/00* (2006.01)
*E21B 17/18* (2006.01)
(Continued)

(52) U.S. Cl.
CPC ................ *E21B 17/18* (2013.01); *B09C 1/08* (2013.01); *C02F 1/72* (2013.01); *E21B 7/18* (2013.01); *B09C 2101/00* (2013.01)

(58) Field of Classification Search
CPC ................ B09C 1/08; E21B 7/18; E02D 3/12
See application file for complete search history.

(56) References Cited

U.S. PATENT DOCUMENTS 4,786,212 A * 11/1988 Bauer ....................... E02D 3/12
405/241
4,844,807 A * 7/1989 Manchak, Jr. ............ B09B 1/00
210/682

(Continued)

FOREIGN PATENT DOCUMENTS

CN 203991656 U 12/2014
CN 104353664 A 2/2015
(Continued)

OTHER PUBLICATIONS

Machine translation of CN205762951 (Year: 2019).*

*Primary Examiner* — Janine M Kreck
(74) *Attorney, Agent, or Firm* — Muncy, Geissler, Olds & Lowe, P.C.

(57) ABSTRACT

An in-situ injection of soil and groundwater—high pressure rotary jet grouting in-situ remediation system and method. The system has an agent dispensing station, high pressure grouting pump, air compressor, rotary jet grouting drilling machine, second double-pipe water flow joint, automatic lifting mechanism for grouting drill pipe of rotary jet grouting drilling machine, high pressure jet drill pipe, inner tube for high pressure jet triple drill pipe, outer tube for high pressure jet triple drill pipe, agent jet nozzle, an air jet nozzle, cemented carbide block and a drill bit. Parameters are arranged according to the triangle method to ensure that the remediation area is covered within the diffusion radius of (Continued)

the agent. After positioning the GPS measuring point, a guided-boring rig is positioned at the center of the injection point. The high pressure injection remediation uses a double-pipe: using gas and liquid fluids to spread the soil while cutting the soil from bottom to top to achieve thorough mixing of the remediation agent with soil and groundwater; quickly combining laboratory testing to obtain parameters for remediation agent residues, pH values, and contaminant concentrations to verify the in-situ remediation effect and monitor the residual agent.

5 Claims, 3 Drawing Sheets

(51) Int. Cl.
*B09C 1/08* (2006.01)
*C02F 1/72* (2006.01)
*E21B 7/18* (2006.01)

(56) References Cited

U.S. PATENT DOCUMENTS

| | | |
|---|---|---|
| 5,868,523 A | 2/1999 | Nickell |
| 6,834,720 B1* | 12/2004 | Dwyer ............... B09C 1/00 166/177.4 |
| 2011/0110726 A1* | 5/2011 | Plahert ............... E02D 3/12 405/269 |

FOREIGN PATENT DOCUMENTS

| | | |
|---|---|---|
| CN | 104815844 A | 8/2015 |
| CN | 105964678 A | 9/2016 |
| CN | 205762951 U | 12/2016 |
| JP | 2012250171 A | 12/2012 |

* cited by examiner

IN-SITU INJECTION OF SOIL AND GROUNDWATER—HIGH PRESSURE ROTARY JET GROUTING IN-SITU REMEDIATION SYSTEM AND METHOD

TECHNICAL FIELD

The present invention relates to an in-situ injection of soil and groundwater—high pressure jet grouting in situ remediation method, belongs to the technical field of soil and groundwater in situ remediation system and remediation method.

BACKGROUND TECHNOLOGY

Soil and groundwater environments are an important part of the ecosystem. In recent years, with the global industrialization process, China's soil contamination has become increasingly serious. Among them, organic contamination and heavy metal contamination have become two important types of contamination, which not only damage the ecological environment itself, but also directly or indirectly endanger the environment and human health and safety. More seriously, volatile and semi-volatile organic contaminants and soluble heavy metals may migrate to deep saturated regions (aquifers) in unsaturated regions (aeration zones), especially resulting in a menace to groundwater resources, causing serious consequences.

At present, the commonly used soil and groundwater remediation engineering techniques are divided into two types: in situ remediation and ectopic remediation. According to their remediation methods, they can be divided into physical remediation, chemical remediation and bioremediation. Since ectopic remediation involves excavation, transportation, remediation/disposal of contaminated soil, and extraction, temporary storage or in-situ ectopic treatment of groundwater, it is easy to cause leakage and spread of pollutants. And the disposal process needs to be strictly supervised, and the management requirements are high. And the in-situ remediation does not involve the excavation and support of deep foundation pits, and basic constructions of precipitation and water stop for foundation pits, which effectively avoid secondary pollution and reduce the probability of safety accidents. The in-situ remediation technology of soil and groundwater has been favored in China in recent years.

Due to factors such as diversification of remediation media in contaminated sites (soil and water combined pollution, individual soil contamination, individual groundwater contamination), complexity of hydrogeological conditions, diversity of pollution types (organic contamination heavy metals, etc.), particularity of contaminants and uneven distribution and difference in soil and groundwater, the difficulty and challenge of in situ remediation of soil and groundwater has been determined. Therefore, it is particularly urgent to research and develop in-situ engineering remediation technology for soil and groundwater remediation in line with China's national conditions.

Since the mid-1980s, the United States has invested heavily in soil and groundwater remediation. Some new in-situ remediation techniques have emerged, such as in-situ chemical oxidation, in-situ chemical reduction, and in situ microbial remediation.

In-situ chemical oxidation, in-situ chemical reduction and in situ microbial remediation refer to adding a remediation agent (chemical oxidant, reducing agent, microbial preparation) to the underground environment and making it chemically react or biochemically react with the contaminants to be degraded into non-toxic or low-toxic substances (such as carbon dioxide, water, trivalent chromium etc.) for achieving pollutant removal and purification. This type of technology can process a variety of contaminants at the same time, and the treatment efficiency is high. Among them, the microbial remediation technology is suitable for treating low concentration sites, and chemical oxidation/reduction is generally not limited by the concentration of contaminants Commonly used reducing agents (such as zero-valent iron, EH, ferrous sulfate) can remedy pollutants such as halogenated hydrocarbons and heavy metals (hexavalent chromium) in soil and groundwater. Common oxidants (such as persulfate, hydrogen peroxide, potassium permanganate, etc.) can remedy organic pollutants such as benzene, nitrobenzene and petroleum hydrocarbons in soil and groundwater. Microbial agents can remedy organic contaminants such as benzene series and petroleum hydrocarbons in soil and groundwater.

There are two main ways to inject the existing remediation agent in situ: mixing and infusion/injection, where in situ injection/injection is divided into: Geoprobe direct pressure high pressure injection, well injection (PVC injection well), Chemgrout grouting technology, deep mixing in-situ grouting technology and other geotechnical grouting techniques.

U.S. Pat. No. 5,639,182, "Soil In-situ Remediation Method" relates to an in-situ soil agitation method, wherein a mobile crawler rig equipped with a vertically driven impeller bit that allows for in situ agitation of contaminated soil. The agitation drill bit employed is an integrated impeller bit, so the mixing depth is limited and the resistance is large. The application has certain limitations and is only suitable for the treatment of looser formations.

Application No. 201510159423.2, "Chromium contamination in-situ remediation method", Chinese invention patent, mentioning a Geoprobe high-pressure injection method and distribution method (the highest pressure is only 18 Mpa, it is essentially a single tube injection; the disadvantage is that the construction efficiency is low and it is difficult to meet the engineering application), does not consider the flow of groundwater and the diffusion factor of the agent. Application No. 201420009983.0, "Soil remediation high-pressure injection jet-grouting drilling machine", Chinese invention patent, adopts essentially the single-tube injection.

In-situ drill bit direct pressure injection is to inject the configured agent into the contaminated soil layer through the injection drill bit under a certain pressure and continuously mix uniformly the contaminated soil with the oxidizing agent to remedy the contaminated soil and groundwater. Two chemically oxidized in-situ drill bit injection remediation systems are disclosed in U.S. Patent No. US 2002/0143226 A1 and U.S. Pat. No. 6,457,905. Both remediation systems inject chemical oxidants into contaminated soil through auger drills or injection drill bits.

In Chinese invention patents related to the well injection technique such as the application number 201410387735.4 "In-situ remediation device and in-situ remediation method of organic contaminated soil and groundwater", application number 201410615166.4 "In-situ chemical oxidation injection device for remedying contaminated soil and groundwater", etc., a well-injection in-situ chemical oxidation remediation technique is mentioned, this is a remediation method for setting up an injection well in the remediation area before remediation. This type of method generally uses PVC material wells, the injection pump uses a pneumatic diaphragm pump, and the injection pressure is low (less than 1.6 Mpa). On the one hand, the construction cost for the well is relatively high, and it is necessary to construct a large number of injection wells. The capital construction cost is high and the construction period is long. And after the completion of the construction, the injection well will remain in the remedied land, which will affect subsequent redevelopment and utilization. On the other hand, the injection pressure is insufficient (using natural flow or low pressure injection), and the formation conditions have a great influence on the injection effect. If the clay layer or formation properties are not uniform, the agent cannot spread evenly, affecting the remediation effect and even failing to complete the remediation. The saturated layer soil is difficult to grout, the diffusion radius is small, and the applicable formation is limited, and the clay layer almost loses its diffusion effect.

In-situ injection well injection is a chemical oxidation remediation system that decomposes pollutants by constructing an injection well at a contaminated site and diffusing the oxidant at a certain pressure through the injection well screen into the contaminated soil layer. A chemical oxidation injection well injection system is disclosed in U.S. Patent No. 2003/0069142. The device is provided with a deflector in front of the screen tube containing the solid powder agent, so that after the agent in the screen tube dissolves, the contaminated soil and groundwater are remedied as the agent flows with the groundwater and diffuses to the target area through the deflector. A chemical oxidation in-situ injection well remediation technique is disclosed in U.S. Patent No. US 2008/0174571 A1. The remediation system injects hydrogen peroxide, ozone and compressed air into the ground through injection wells to remedy contaminated soil and groundwater. Well construction for injection wells is currently performed by the United States Geoprobe drilling rigs or domestic geological drilling rigs (such as 30 drilling rigs, car drilling), and more rotary or percussion drilling methods are used. Large-scale contaminated sites require a certain period of time to construct wells.

The existing high-pressure rotary jet grouting pile foundation technology is a ground treatment construction technology, which is mainly used in the geotechnical field for water curtains, slope protection piles, etc., uses a rotary jet grouting drilling machine to form a hole, then enters the jet drill pipe, and sprays a high-pressure cement slurry through the nozzle, forms a solidified pile or a water stop curtain by cutting the soil, to achieve the foundation reinforcement or water stopping.

The application process of the above remediation technology requires a series of in-situ remediation systems and remediation methods to achieve the dosage of the remediation agent.

SUMMARY OF THE INVENTION

The object of the present invention is to solve the problems of insufficient injection pressure, low injection efficiency, small diffusion radius of the agent, and difficulty in ensuring the amount of grouting affecting on the diffusion effect caused by remediation injection of the saturated layer in the above existing in situ remediation system. Further, an in-situ injection of soil and groundwater—high pressure rotary jet grouting in situ remediation system and method is provided.

The object of the present is realized by the following technical schemes:

An in-situ injection of soil and groundwater—high pressure rotary jet grouting in situ remediation system, comprising an agent dispensing station, an agent dispensing station outlet valve, an agent dispensing station outlet stainless steel quick connector, a high pressure grouting pump inlet valve, a high pressure grouting pump, a high pressure grouting pump outlet valve, a high pressure grouting pipe, an air compressor, an air compressor outlet valve, a compressed air line, a rotary jet grouting drilling machine, a power head, a high pressure water joint, a high pressure water joint agent liquid flow inlet, a high pressure water joint air flow inlet, a second double-pipe water flow joint, an automatic lifting mechanism for grouting drill pipe of jet grouting drilling machine, a high pressure jet drill pipe, an inner tube for high pressure jet triple drill pipe, an outer tube for high pressure jet triple drill pipe, an agent jet nozzle, an agent jet nozzle, an air jet nozzle, a cemented carbide block and a drill bit; the outlet of the agent dispensing station is mounted with the agent dispensing station outlet valve, the agent dispensing station outlet valve is connected to the high pressure grouting pump inlet valve by the agent dispensing station outlet stainless steel quick joint, the high pressure grouting pump inlet valve is connected to the outlet of the high pressure grouting pump, and the outlet of the high pressure grouting pump is connected to the high pressure grouting pump outlet valve; the lower end of the power head of the jet grouting drilling machine is mounted with the high pressure water joint, the high pressure water joint is respectively mounted with the high pressure water joint agent liquid flow inlet, the high pressure water joint air flow inlet, and the second double-pipe water flow joint, one end of the high pressure grouting pipe is connected to the high pressure grouting pump outlet valve, and the other end of the high pressure grouting pipe is connected to the high pressure water joint agent liquid flow inlet; the lower part of the power head is mounted with a hoisting steel wire rope connected to the automatic lifting mechanism for grouting drill pipe of rotary jet grouting drilling machine, the lower portion of the high pressure water joint is mounted with the high pressure jet drill pipe, the high pressure jet drill pipe is assembled from the inner tube for high pressure jet triple drill pipe and the outer tube for high pressure jet triple drill pipe, the inner tube for high pressure jet triple drill pipe is provided with the agent jet nozzle, the outer tube for high pressure jet triple drill pipe is provided with the air jet nozzle, the drill bit is mounted on the bottom end of the high pressure jet drill pipe, and the drill bit is mounted with the cemented carbide block; the high pressure water joint agent liquid flow inlet is communicated with the inner tube for high pressure jet triple drill pipe, the high pressure water joint air flow inlet is communicated with the outer tube for high pressure jet triple drill pipe; the outlet of the air compressor is connected with the air compressor outlet valve, one end of the air compressor outlet valve is connected to the air compressor outlet valve, one end of the air compressor outlet valve is connected to the high pressure water joint air flow inlet, and the second double-pipe water flow joint is connected to the high pressure water joint.

An in-situ injection of soil and groundwater—high pressure rotary jet grouting in situ remediation method, Step one: distributing and guided-boring:

arranging parameters according to the triangle method to ensure that the remediation area is covered within the diffusion radius of the agent, after positioning the GPS measuring point, positioning a guided-boring rig at the center of the injection point, wherein the air compressor is always turned on during the percussion rotary drilling process, the compressed air is used as the power source and the air pressure of the air compressor is 0.7~0.8 MPa; a percussion rotary drilling method using a pneumatic down-the-hole hammer is adopted to form a hole, and the injection hole has an aperture diameter of 110 mm and a hole depth of 3 to 5 m; penetrating the hard layer of the mixed soil or the original site concrete, etc., in the case of the gravel layer and the fractured and easily collapsed stratum, it is necessary to drill into the hole to ensure the smooth drilling of the high pressure injection drill pipe in the high pressure injection stage;

Step two: in-situ injection of remediation agent—high pressure rotary jet grouting:

the high pressure injection remediation uses a double-pipe: using gas and liquid fluids to spread the soil while cutting the soil from bottom to top to achieve thorough mixing of the remediation agent with soil and groundwater; after the jet drill pipe is drilled down to the maximum depth of the design remediation, the high pressure grouting pump is turned on to inject the compressed air while spraying the high pressure liquid flow, and lifting is performed and the drill pipe is rotated from the bottom to the top by the automatic lifting mechanism of rotary jet grouting drilling machine; after the agent is sprayed to the top level of the remediation design, the high pressure grouting pump is stopped, and the compressed air continues to be sprayed until the complete lifting of the drill bit stops the supply of air; in the agent spaying process, the air pressure of the air compressor is maintained at 0.7~0.8 Mpa, the injection pressure of the high pressure grouting pump is 25~30 Mpa, the grouting flow is 20~120 L/min, the lifting speed is 5~20 cm/min, and the diffusion radius of the agent reaches 0.8~3.5 m;

Step three: late monitoring of agent reaction:

after the remediation agent is injected and the agent is fully reacted, a plurality of 2-inch PVC groundwater monitoring wells and soil sample points is set within the diffusion radius of the area where a round of injection remediation has been completed; the soil and groundwater samples are acquired for quickly combining laboratory testing to obtain parameters for remediation agent residues, pH values, and contaminant concentrations to verify the in situ remediation effect and monitor the residual agent; the purpose of this step is to guide the optimal design of the dosing parameters of the agent as a basis for whether or not to perform two or more rounds of supplemental remediation.

The beneficial effects of the present invention are:

1. The remediation system is simple in design, small in equipment, and easy to move. It is superior to complex designs or special equipment such as necessary exhaust or wastewater system required for other technologies such as in-situ heating, thermal desorption or soil leaching. The remediation costs are lower than that for situ heating, thermal desorption and other technologies. The remediation efficiency of the in-situ system and the removal of contaminants may be optimally achieved.

2. Compared with a single tube injection method such as a high pressure injection of a drill bit (e.g., Geoprobe drill) or a Chemgrout grouting method, the present invention adopts a gas and liquid double tube high pressure injection process, which on the one hand has a high injection pressure (25~30 Mpa). However, at present, the maximum pressure of the drill bit injection is only 18 Mpa, and the injection pressure is small, the diffusion radius of the remediation agent is relatively small and the diffusion is uneven, in addition, slurry-return for the single tube injection is more serious when encountering shallow groundwater remediation sites. On the other hand, the effect of the high-pressure air flow in the process of injecting the remediation agent fluid significantly increases the diffusion effect of the remediation agent in the soil and groundwater environment, and the diffusion radius increases remarkably. The formation suitable for high-pressure injection of the drill bit has a small amount. For low-permeability formation injection, due to insufficient pressure and single-tube operation, it is easy to form preferential fracturing channels and the injection efficiency is low. Further, the drill bit injection system has a problem of low injection efficiency due to the small flow rate of the configured grouting pump. Therefore, the present invention may overcome the defects of small diffusion radius, serious slurry return and low injection efficiency in the single tube injection method of the drill bit.

3. Compared with the well construction injection technology, the application range of the present invention has been greatly expanded. The prior art is only applicable to medium to high permeability formations (such as fine sand, medium coarse sand, etc.), while the technical application of the present invention may be extended to low to medium permeability formations (e.g., silty clay, silt, silty clay, clay layers). Injection well technology is only suitable for non-saturated layers or sites with deep groundwater levels due to the small injection pressure, while the present invention may be applied to the pollution for single soil, the pollution for groundwater combined with soil (saturated layer), the pollution for single groundwater, etc., and may solve the problem of maximum grouting amount and slurry return in the in-situ injection process, and greatly improve the injection efficiency. At the same time, the present invention is better than the injection well in linear-meter-controlling the injection parameters of the drug according to the depth, so that the demand for optimizing agent dosage parameters by depth partition in treatment of soil and groundwater in large and complex contaminated sites may be achieved. The present invention replaces the injection well by means of injection point (drilling) so as to one the one hand save the cost of well construction, and on the other hand to put into use immediately without cleaning up the sites after the construction of agent injection due to the absence of waste equipments such as PVC wells in the sites after remediation. In the present invention, the injection amount for each linear meter per hole is large. Generally, a round of injection (using a double spray process if necessary) may meet the engineering design needs. The agents for injection well are dosed with intermittent multiple injections. Thus, the injection well remediation method has a relatively long remediation cycle.

4. By using the present invention, a pneumatic percussion rotary drilling method is used in the hole guiding stage, while large-scale contaminated sites need a certain period of time to build wells in terms of the well construction of the injection wells using the US Geoprobe rigs or domestic geological rigs (such as 30 rigs, car rigs, etc.) where the rotary or percussion drilling methods are often used. The introduction of air flow during the drilling process on the one hand improves the construction efficiency and reduces the cost. On the other hand, the introduction of the air flow is beneficial to open the soil pores of the mixed fill layer, and provides favorable conditions for the uniform diffusion of the agent for injecting the unsaturated layer in the later period. The method of guiding the hole has lower costs and provides time guarantee for the subsequent in-situ injection—continuous construction of the high pressure rotary jet grouting operation.

5. Compared with traditional rotary jet grouting pile construction techniques, the gas (air)-liquid (remediation agent) double tube high pressure injection process adopted by the present invention and the diffusion radius design are based on the splitting theory and the penetration diffusion theory, agent diffusion radius=mixing radius+penetration diffusion radius; the rotary jet grouting pile generally adopts the triple tube process of gas (air), liquid (water) and liquid (cement slurry), based on the splitting theory, wherein the pile radius is much smaller than the diffusion radius of the design of the present invention and the triple tube process is so serious in slurry returning that it is difficult to apply to the remediation of soil and groundwater.

6. Being equivalent to stirring technology, such as hot air blowing deep layer mixing, the remediation method is performed top-down, may not solve the remediation problem of the sandwich layer. The present invention adopts fixed depth injection remediation, which may solve defects and contradictions such as disturbing the upper non-polluting part by the mixing technology, causing serious secondary pollution and destroying bearing capacity of the foundation. At the same time, the energy consumption of mechanical agitation is much larger than the energy consumption of the equipment for effectively diffusing the airflow and the liquid flow in the present invention. The fixed depth remediation solves the problem of soil and groundwater remediation in the sandwich layer, and maintains the original bearing capacity after construction, in particular, it has economic advantages in the remediation of sand soil and groundwater and is significant in highly efficient construction.

The reference numerals in the drawings: 1—agent dispensing station, 2—agent dispensing station outlet valve, 3—agent dispensing station outlet stainless steel quick connector, 4—high pressure grouting pump inlet valve, 5—high pressure grouting pump, 6—high pressure grouting pump pressure gauge, 7—high pressure grouting pump outlet valve, 8—high pressure grouting pipe (and liquid flow injection flow), 9—air compressor fresh air inlet, 10—air compressor inlet valve, 11—air compressor, 12—air compressor pressure gauge, 13—air compressor outlet valve, 14—compressed air line (and air injection flow direction), 15—rotary jet grouting drilling machine, 16—power head, 17—high pressure water joint, 18—high pressure water joint agent liquid flow inlet; 19—high pressure water joint air flow inlet, 20—second double-pipe water flow joint (closed), 21—automatic lifting mechanism for grouting drill pipe of rotary jet grouting drilling machine, 22—high pressure jet drill pipe (triple pipe), 23—inner tube for high pressure jet triple drill pipe, 24—outer tube for high pressure jet triple drill pipe, 25—hole introduction section, 26—end rotary jet grouting segment, 27—rotary jet grouting injection remediation segment, 28—agent jet nozzle, 29—agent jet liquid flow, 30—air jet nozzle, 31—air jet air flow, 32—cemented carbide block, 33—drill bit, 34—agent penetration diffusion area, 35—agent splitting mixing area, 36—agent diffusion direction, 37—miscellaneous fill layer, 38—silty clay layer, 39—fine sand layer (aquifer), 40—silty clay layer, 41—groundwater level burial depth, R1—splitting agitation radius, R2—penetration diffusion radius (R1+R2 is the effective diffusion radius of the agent).

EMBODIMENTS OF THE INVENTION

The present invention will be further described in detail below with reference to the accompanying drawings. This embodiment is implemented on the premise of the technical solution of the present invention, and the detailed embodiment is given, but the scope of protection of the present invention is not limited to the following embodiments.

As shown in FIGS. 1 to 4, an in-situ injection of soil and groundwater—high pressure rotary jet grouting in situ remediation system related to the present embodiment, comprising an agent dispensing station 1, an agent dispensing station outlet valve 2, an agent dispensing station outlet stainless steel quick connector 3, a high pressure grouting pump inlet valve 4, a high pressure grouting pump 5, a high pressure grouting pump outlet valve 7, a high pressure grouting pipe 8, an air compressor 11, an air compressor outlet valve 13, a compressed air line 14, a rotary jet grouting drilling machine 15, a power head 16, a high pressure water joint 17, a high pressure water joint agent liquid flow inlet 18, a high pressure water joint air flow inlet 19, a second double-pipe water flow joint 20, an automatic lifting mechanism for grouting drill pipe of rotary jet grouting drilling machine 21, a high pressure jet drill pipe 22, an inner tube for high pressure jet triple drill pipe 23, an outer tube for high pressure jet triple drill pipe, an agent jet nozzle 24, an agent jet nozzle 28, an air jet nozzle 30, a cemented carbide block 32 and a drill bit 33; the outlet of the agent dispensing station 1 is mounted with the agent dispensing station outlet valve 2, the agent dispensing station outlet valve 2 is connected to the high pressure grouting pump inlet valve 4 by the agent dispensing station outlet stainless steel quick joint 3, the high pressure grouting pump inlet valve 4 is connected to the outlet of the high pressure grouting pump 5, and the outlet of the high pressure grouting pump 5 is connected to the high pressure grouting pump outlet valve 7; the lower end of the power head 16 is mounted with the high pressure water joint 17, the high pressure water joint 17 is respectively mounted with the high pressure water joint agent liquid flow inlet 18, the high pressure water joint air flow inlet 19, and the second double-pipe water flow joint 20, one end of the high pressure grouting pipe 8 is connected to the high pressure grouting pump outlet valve 7, and the other end of the high pressure grouting pipe 8 is connected to the high pressure water joint agent liquid flow inlet 18; the lower part of the power head 16 is mounted with a hoisting steel wire rope connected to the automatic lifting mechanism for grouting drill pipe of rotary jet grouting drilling machine 21, the lower portion of the high pressure water joint 17 is mounted with the high pressure jet drill pipe 22, the high pressure jet drill pipe 22 is assembled from the inner tube for high pressure jet triple drill pipe 23 and the outer tube for high pressure jet triple drill pipe 24, the inner tube for high pressure jet triple drill pipe 23 is provided with the agent jet nozzle 28, the outer tube for high pressure jet triple drill pipe 24 is provided with the air jet nozzle 30, the drill bit 33 is mounted on the bottom end of the high pressure jet drill pipe 22, and the drill bit 33 is mounted with the cemented carbide block 32; the high pressure water joint agent liquid flow inlet 18 is communicated with the inner tube for high pressure jet triple drill pipe 23, the high pressure water joint air flow inlet 19 is communicated with the outer tube for high pressure jet triple drill pipe 24; the outlet of the air compressor 11 is connected with the air compressor outlet valve 13, one end of the air compressor outlet valve 14 is connected to the air compressor outlet valve 13, one end of the air compressor outlet valve 14 is connected to the high pressure water joint air flow inlet 19, the second pipe water flow joint 20 is connected to the high pressure water joint 17, and the second water flow joint 20 is closed or connected externally to a water pump (the interface is closed in this embodiment).

Figure 2:
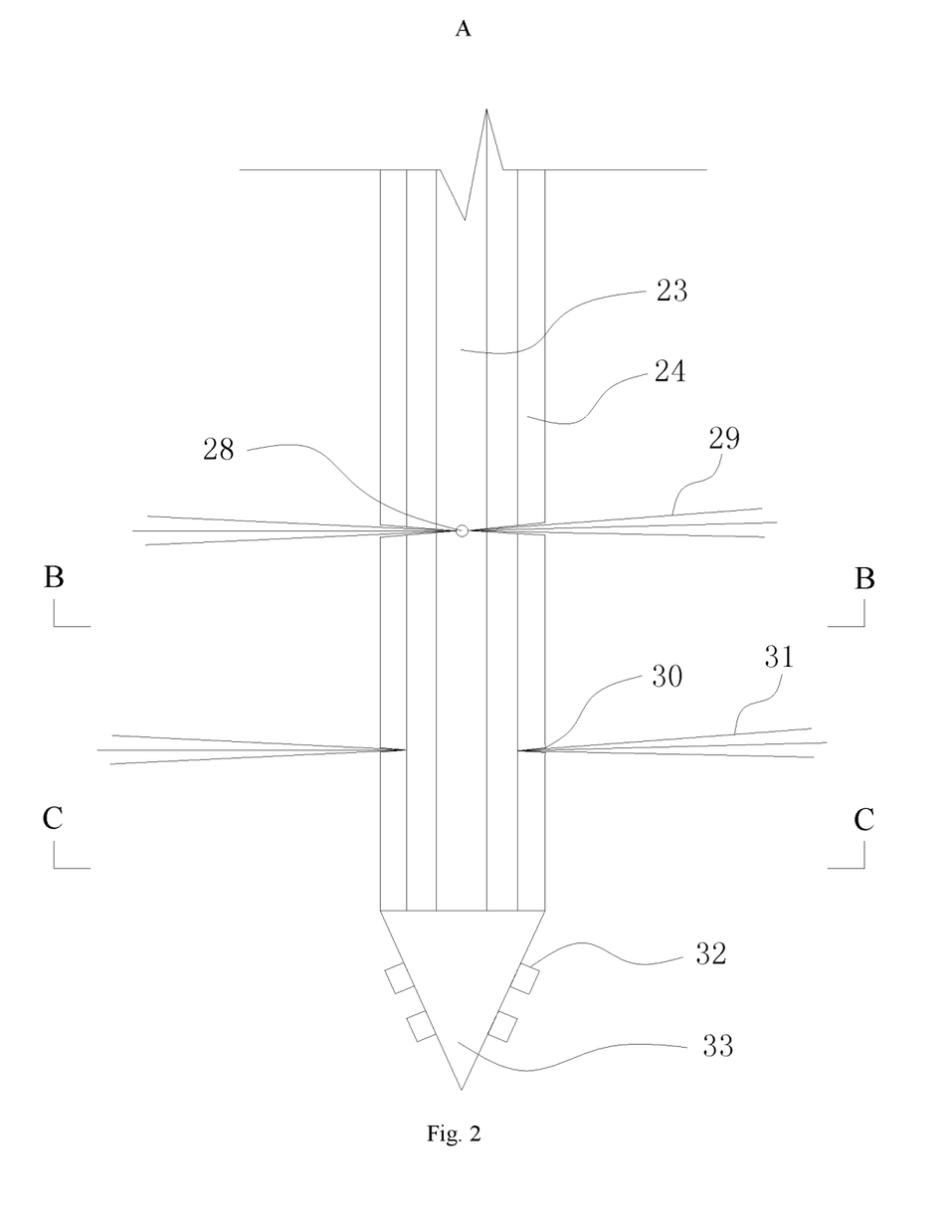
FIG. 2 is an enlarged view of A of FIG. 1.
Figure 3:
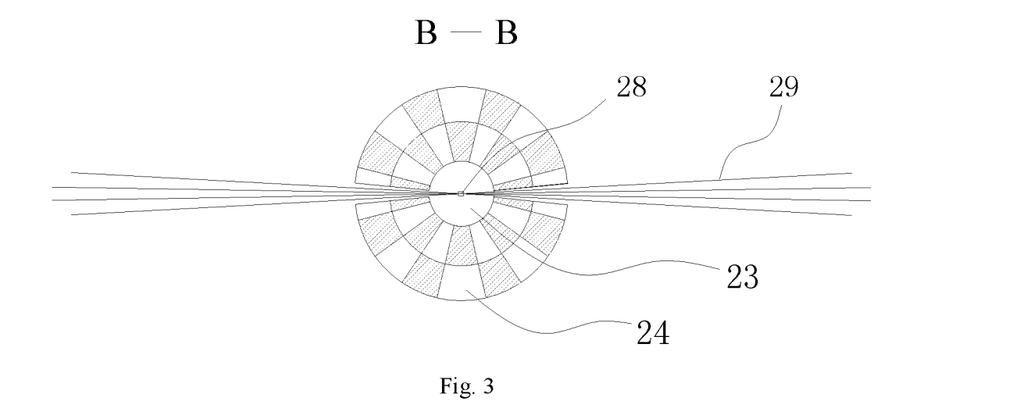
FIG. 3 is a cross-sectional view taken along line B-B of FIG. 2.
Figure 4:
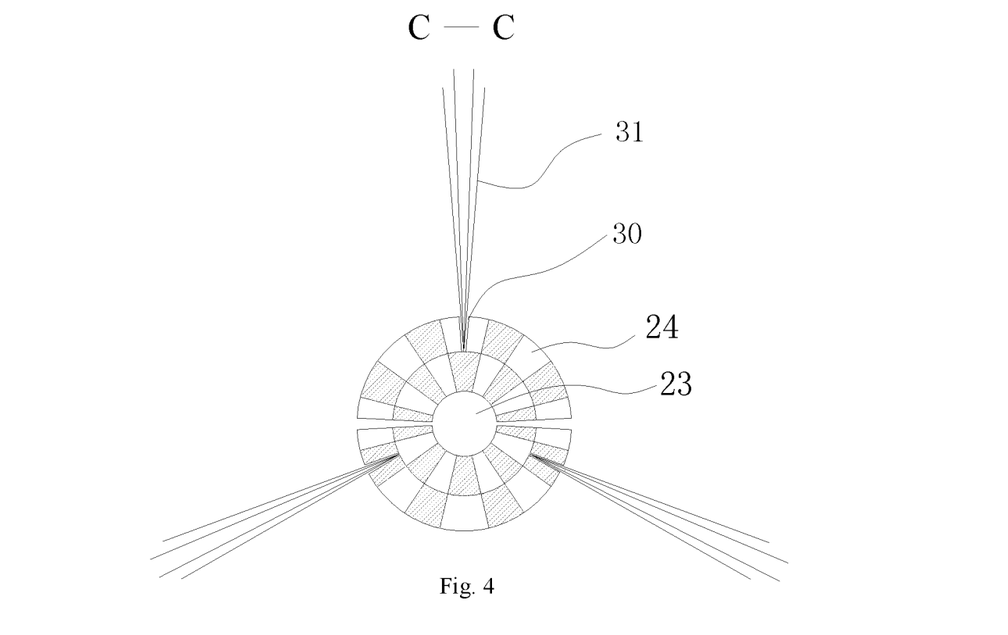
FIG. 4 is a cross-sectional view taken along line C-C of FIG. 2.

The agent jet nozzle 28 is set to two, and the two agent jet nozzles 28 are horizontally distributed at 180°; the air jet nozzle 30 is set to three, and the three air jet nozzles 30 are horizontally distributed at 120°, the air jet nozzle 30 being arranged at a position of 100 to 200 mm below the agent jet nozzle 28.

Figure 1:
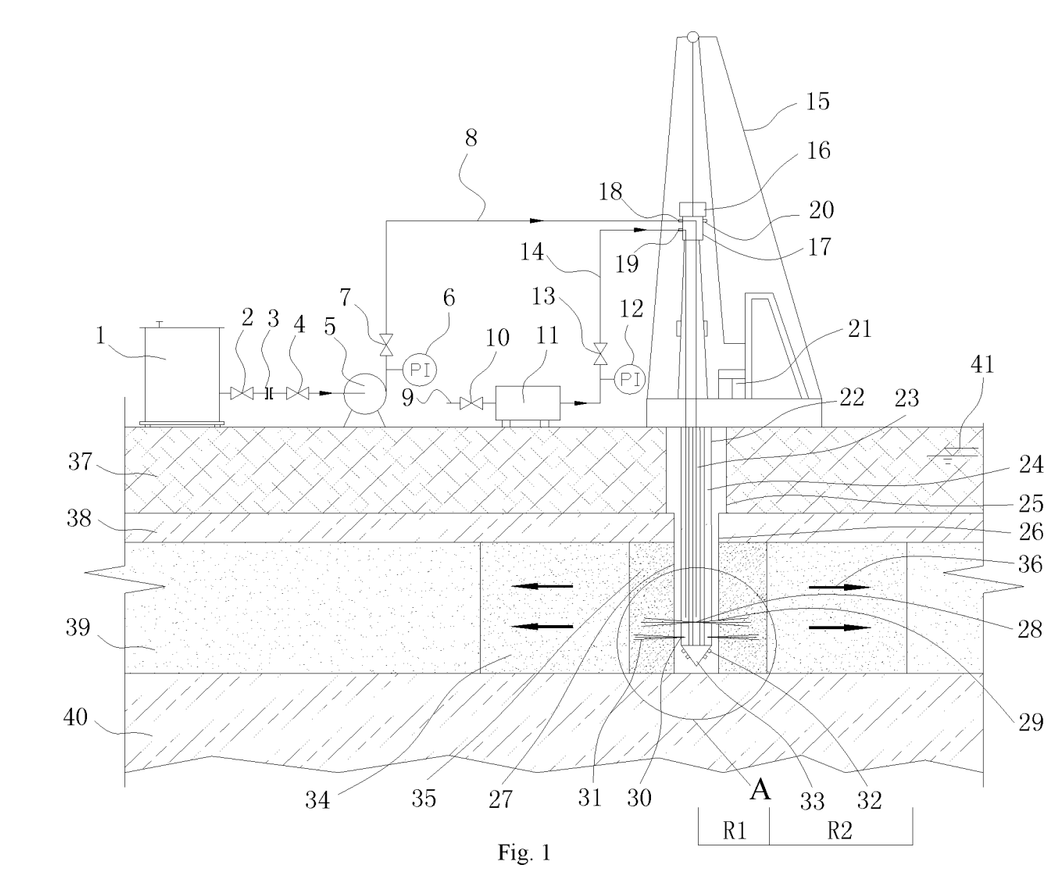
FIG. 1 is a view of in-situ injection of soil and groundwater—high pressure rotary jet grouting in situ remediation system and working principle in the present invention.

The grouting pressure (injection pressure of agent) of the high pressure grouting pump 5 is 25~30 Mpa, and the air pressure of the air compressor 11 is 0.7~0.8 Mpa.

The air compressor 11 is a screw air compressor.

The present embodiment relates to an in-situ injection of soil and groundwater—high pressure rotary jet grouting in situ remediation method comprising steps of:

Step one: distributing and guided-boring:

arranging parameters according to the triangle method to ensure that the remediation area is covered within the diffusion radius of the agent, after positioning the GPS measuring point, positioning a guided-boring rig at the center of the injection point (drilling hole), wherein the air compressor is always turned on during the percussion rotary drilling process, the compressed air is used as the power source and the air pressure of the air compressor is 0.7~0.8 MPa; a percussion rotary drilling method using a pneumatic down-the-hole hammer is adopted to form a hole (injection point), and the injection hole has an aperture diameter of 110 mm and a hole depth of 3 to 5 m; penetrating the hard layer of the mixed soil or the original site concrete, etc., in the case of the gravel layer and the fractured and easily collapsed stratum, it is necessary to drill into the hole (e.g., by a steel pipe sleeve) to ensure the smooth drilling of the high pressure injection drill pipe in the high pressure injection stage;

Step two: in-situ injection of remediation agent—high pressure rotary jet grouting:

the high pressure injection remediation uses a double-pipe: using gas (compressed air) and liquid (remediation agent solution/slurry) fluids to spread the soil while cutting the soil from bottom to top to achieve thorough mixing of the remediation agent with soil and groundwater; after the jet drill pipe is drilled down to the maximum depth of the design remediation, the high pressure grouting pump is turned on to inject the compressed air while spraying the high pressure liquid flow (remediation agent solution/slurry), and lifting is performed and the drill pipe is rotated from the bottom to the top by the automatic lifting mechanism of rotary jet grouting drilling machine; after the agent is sprayed to the top level of the remediation design, the high pressure grouting pump is stopped, and the compressed air continues to be sprayed until the complete lifting of the drill bit stops the supply of air; in the agent spaying process, the air pressure of the air compressor is maintained at 0.7~0.8 Mpa, the injection pressure of the high pressure grouting pump is 25~30 Mpa, the grouting flow is 20~120 L/min, the lifting speed is 5~20 cm/min, and the diffusion radius of the agent reaches 0.8~3.5 m;

Step three: late monitoring of agent reaction:

after the remediation agent is injected and the agent is fully reacted, a plurality of 2-inch PVC groundwater monitoring wells and soil sample points is set within the diffusion radius of the area where a round of injection remediation has been completed; the soil and groundwater samples are acquired for quickly combining laboratory testing to obtain parameters for remediation agent residues, pH values, and contaminant concentrations to verify the in situ remediation effect and monitor the residual agent; the purpose of this step is to guide the optimal design of the dosing parameters of the agent as a basis for whether or not to perform two or more rounds of supplemental remediation.

Embodiment 1

The project is a soil and groundwater remediation project of a chemical plant in Nanjing. The amount of soil remediation works is 258000 square meters, the amount of groundwater remediation works is 170000 square meters, and the construction period requires 150 days. The maximum remediation depth of the soil in this site is 12 m. There are two layers of silty clay layer and the aquifer is fine sand layer (distributed at 3~6 m or 4~7 m). The groundwater is shallow (about 1 m) and rich. The target contaminants in soil and groundwater are VOCs/SVOCs organic substances such as chlorobenzene, benzene, and p/o-nitrochlorobenzene. The remediation medium is divided into two types: combined pollution of soil and groundwater, and separate contamination areas of groundwater. In the early stage, the test work of injecting oxidant into the injection well was used, which has the disadvantages of high cost, small diffusion radius, being unsuitable for injection of silty clay layer and saturated layer, slow construction progress, difficulty in ensuring injection volume and serious slurry return. The remediation technology mainly uses in-situ chemical oxidation technology. In order to solve the complex problems in the in-situ remediation project, 61% of the soil remediation and 66% of the groundwater remediation work in the project adopt the present invention as a specific process for in-situ chemical oxidation. Practices have shown that a single process technology may not solve the engineering remediation of complex contaminated sites, and a high proportion of applications also indicates the advantages of the present invention.

The construction efficiency of the system:

(1) Efficiency of guided-boring for single set of guided-boring device: 50~70 holes/day (single hole is accounted in terms of 3 m depth, 8 hours' working day).

(2) Processing capacity of a single set of high pressure rotary jet grouting device: the soil remediation is 500-900 square meters of soil/day; the groundwater remediation is 500-700 square meters of groundwater/day.

Advantages of the method:

(1) Applicable to a wide range of soil layers: raw soil such as silt, sand, silty clay;

(2) Capable of realizing fixed depth remediation, with large remediation depth and high efficiency;

(3) Without disturbance to the ground surface, basically without impact on the bearing capacity of the foundation after remediation;

(4) High injection pressure is high, large diffusion radius, particularly significant effects in aquifer;

(5) Capable of remedying soil and groundwater or separate groundwater at the same time.

The application statistics table for the in-situ injection of soil and groundwater—high pressure rotary jet grouting in situ chemical oxidation remediation method is shown in Table 1.

TABLE 1

Application statistics for soil and groundwater

| Remediation Type | Remediation Technology Classification | Remediation process Classification | Specific application | Soil Remediation Quantity of work (m³) | groundwater Remediation Quantity of work (m²) | Remarks |
|---|---|---|---|---|---|---|
| Soil/groundwater block | In situ chemical oxidation | In situ injection - high pressure rotary jet grouting | Case ☐: 0~12 m (clay-based); Case ☐: 6~8 m (clay-based); Case ☐: 3~4 m (fine sand-based); Case ☐: 4~5 m (fine sand-based); | 157033 | 30342 | Combined contamination |
| Separate groundwater areas | In situ chemical oxidation | In situ injection - high pressure rotary jet grouting | Case ☐: 3~6 m (fine sand aquifer); Case ☐: 4~7 m (fine sand aquifer); | 0 | 81403 | Separate water contamination |
| All site Statistics | | | | 157033 | 111745 | |

The remediation effects for soil and groundwater are shown in Table 2 and Table 3.

TABLE 2

Remediation effects for soil (in-situ injection of soil and groundwater - high pressure rotary jet grouting in situ chemical oxidation remediation method)

| Remediation block/area number | Remediation depth (m) | Target pollutants | Original site survey concentration (mg/kg) | Acceptance data (mg/kg) | Remediation target (mg/kg) | Removal ratio (%) | Remarks |
|---|---|---|---|---|---|---|---|
| N3-1 Soil/ground water block | 0~5 | P/O-nitrochlorobenzene | 2740 | 1.6 | 19 | 99.94 | Combined contamination of soil and water, simultaneous remediation; seriously-contaminated block |
| | | chlorobenzene | 539 | 2.9 | 129 | 99.46 | |
| | 5~12 | P/O-nitrochlorobenzene | 1160 | 5.2 | 33 | 99.55 | |
| | | chlorobenzene | 186 | 4.15 | 129 | 97.77 | |
| N4 Soil/ground water block | 6~8 | P/O-nitrochlorobenzene | 46.8 | 12.8 | 19 | 72.65 | Combined contamination of soil and water, simultaneous remediation; lightly-contaminated block |

TABLE 3

Remediation effects for groundwater (in-situ injection of soil and groundwater - high pressure rotary jet grouting in-situ chemical oxidation remediation method)

| Remediation block/area number | Remediation depth (m) | Target Pollutants | Original site survey concentration (mg/L) | Acceptance data (mg/L) | Remediation target (mg/L) | Removal ratio (%) | Remarks |
|---|---|---|---|---|---|---|---|
| N3-2 Soil/ground water block | 0~12 | P/O-nitrochlorobenzene | 366 | 3.7 | 5.68 | 98.99 | Combined pollution of soil and water, simultaneous remediation; seriously-contaminated block |
| Separate groundwater IV-2 area | 4~7 | P/O-nitrochlorobenzene | 154.8 | 2.8 | 5.68 | 98.19 | Separate groundwater contamination; seriously-contaminated area |
| | | chlorobenzene | 23.6 | 1.2 | 44 | 94.92 | |
| | | Nitrobenzene | 746 | 0.3 | 46 | 99.96 | |
| Separate groundwater IV-3 area | 3~6 | P/O-nitrochlorobenzene | 18.1 | 0.8 | 5.68 | 95.58 | Separate groundwater contamination; lightly-contaminated area |

The above is only a preferred embodiment of the present invention, and these specific embodiments are based on different implementations under the overall concept of the present invention, and do not limit the protection scope of the present invention, and anyone skilled in the art may easily think of mortifications and alternations within the technical scope disclosed by the present invention, all of which should be contained within the protection scope of the present invention. Therefore, the scope of the present invention should be determined by the scope of the claims.

The invention claimed is:

1. An in-situ injection of soil and groundwater—high pressure rotary jet grouting in situ remediation system, comprising:

an agent dispensing station, an agent dispensing station outlet valve, an agent dispensing station outlet stainless steel quick connector, a high pressure grouting pump inlet valve, a high pressure grouting pump, a high pressure grouting pump outlet valve, a high pressure grouting pipe, an air compressor, an air compressor outlet valve, a compressed air line, a rotary jet grouting drilling machine, a power head, a high pressure water joint, a high pressure water joint agent liquid flow inlet, a high pressure water joint air flow inlet, a second double-pipe water flow joint, an automatic lifting mechanism for grouting drill pipe of rotary jet grouting drilling machine, a high pressure jet drill pipe, an inner tube for high pressure jet triple drill pipe, an outer tube for high pressure jet triple drill pipe, an agent jet nozzle, an agent jet nozzle, an air jet nozzle, a cemented carbide block and a drill bit; wherein the outlet of the agent dispensing station is mounted with the agent dispensing station outlet valve, the agent dispensing station outlet valve is connected to the high pressure grouting pump inlet valve by the agent dispensing station outlet stainless steel quick joint, the high pressure grouting pump inlet valve is connected to the outlet of the high pressure grouting pump, and the outlet of the high pressure grouting pump is connected to the high pressure grouting pump outlet valve; the lower part of the power head of the rotary jet grouting drilling machine is connected to the high pressure water joint, the high pressure water joint is respectively mounted with the high pressure water joint agent liquid flow inlet, the high pressure water joint air flow inlet, and the second double-pipe water flow joint, one end of the high pressure grouting pipe is connected to the high pressure grouting pump outlet valve, and the other end of the high pressure grouting pipe is connected to the high pressure water joint agent liquid flow inlet; the lower part of the power head is mounted with a hoisting steel wire rope connected to the automatic lifting mechanism for grouting drill pipe of rotary jet grouting drilling machine, the lower portion of the high pressure water joint is mounted with the high pressure jet drill pipe, the high pressure jet drill pipe is assembled from the inner tube for high pressure jet triple drill pipe and the outer tube for high pressure jet triple drill pipe, the inner tube for high pressure jet triple drill pipe is provided with the agent jet nozzle, the outer tube for high pressure jet triple drill pipe is provided with the air jet nozzle, the drill bit is mounted on the bottom end of the high pressure jet drill pipe, and the drill bit is mounted with the cemented carbide block; the high pressure water joint agent liquid flow inlet is communicated with the inner tube for high pressure jet triple drill pipe, the high pressure water joint air flow inlet is communicated with the outer tube for high pressure jet triple drill pipe; the outlet of the air compressor is connected with the air compressor outlet valve, one end of the air compressor outlet valve is connected to the air compressor outlet valve, one end of the air compressor outlet valve is connected to the high pressure water joint air flow inlet, the second double-pipe water flow joint is connected to the high pressure water joint, and the second double-pipe water flow joint is in a closed state.

2. The in-situ injection of soil and groundwater—high pressure rotary jet grouting in situ remediation system according to claim 1, wherein the agent jet nozzle includes two jet agent nozzles, and the two agent jet nozzles are horizontally distributed at 180°; the air jet nozzle includes three air jet nozzles, and the three air jet nozzles are horizontally distributed at 120°, and wherein the air jet nozzle being arranged at a position from 100 to 200 mm below the agent jet nozzle.

3. The in-situ injection of soil and groundwater—high pressure rotary jet grouting in situ remediation system according to claim 1, wherein the grouting pressure of the high pressure grouting pump is from 25 to 30 Mpa, and the air pressure of the air compressor is from 0.7 to 0.8 Mpa.

4. The in-situ injection of soil and groundwater—high pressure rotary jet grouting in situ remediation system according to claim 1, wherein the air compressor is a screw air compressor.

5. An in-situ injection of soil and groundwater—high pressure rotary jet grouting in situ remediation method, the method comprising:

Step one: distributing and guided-boring:
arranging parameters to ensure that a remediation area is covered within a diffusion radius of a remediation agent, after positioning a GPS measuring point, positioning a guided-boring rig at a center of an injection point, wherein an air compressor is turned on during a percussion rotary drilling process, the compressed air is used as a power source and the air pressure of the air compressor is from 0.7 to 0.8 MPa; a percussion rotary drilling method using a pneumatic down-the-hole hammer is adopted to form a hole, and an injection hole has an aperture diameter of 110 mm and a hole depth of 3 to 5 m; penetrating a hard layer of a mixed soil;

Step two: in-situ injection of the remediation agent—high pressure rotary jet grouting:
the high pressure injection remediation using a double-pipe, wherein by using gas and liquid fluids to spread the soil while cutting the soil from bottom to top to achieve thorough mixing of the remediation agent with soil and groundwater; after a jet drill pipe is drilled down to a maximum depth of a design remediation, a high pressure grouting pump is turned on to inject the compressed air while spraying the high pressure liquid flow, and lifting is performed and the jet drill pipe is rotated from the bottom to the top by an automatic lifting mechanism of a rotary jet grouting drilling machine; after the remediation agent is sprayed to a top level of the remediation design, the high pressure grouting pump is stopped, and the compressed air continues to be sprayed until the complete lifting of a drill bit stops the supply of air; wherein the air pressure of the air compressor is maintained at 0.7 to 0.8 Mpa, the injection pressure of the high pressure grouting pump is from 25 to 30 Mpa, the grouting flow is from 20 to 120 L/min, the lifting speed is from 5 to 20 cm/min, and the diffusion radius of the agent reaches from 0.8 to 3.5 m;

Step three: late monitoring of agent reaction:
after the remediation agent is injected and the agent is fully reacted, a plurality of 2-inch PVC groundwater monitoring wells and soil sample points are set within the diffusion radius of the area where a round of the injection remediation has been completed; the soil and groundwater samples are acquired for combining laboratory testing to obtain parameters for a remediation agent residues, pH values, and contaminant concentrations to verify the in-situ remediation effect and monitor the residual agent.

\* \* \* \* \*